United States Patent [19]

Kishi et al.

[11] Patent Number: 4,531,490

[45] Date of Patent: Jul. 30, 1985

[54] IDLING SPEED FEEDBACK CONTROL METHOD HAVING FAIL-SAFE FUNCTION FOR ABNORMALITIES IN FUNCTIONING OF CRANK ANGLE POSITION-DETECTING SYSTEM OF AN INTERNAL COMBUSTION ENGINE

[75] Inventors: Noriyuki Kishi, Tokyo; Takashi Koumura, Saitama; Takehiko Hosokawa, Yokohama, all of Japan

[73] Assignee: Honda Giken Kogyo Kabushiki Kaisha, Tokyo, Japan

[21] Appl. No.: 619,789

[22] Filed: Jun. 12, 1984

[30] Foreign Application Priority Data

Jun. 22, 1983 [JP] Japan .................. 58-112294

[51] Int. Cl.$^3$ ............................... F02M 3/06
[52] U.S. Cl. .................... 123/339; 123/479; 123/585
[58] Field of Search ............... 123/339, 479, 585–589

[56] References Cited

U.S. PATENT DOCUMENTS 4,380,985  4/1983  Otsuka et al. ............... 123/589 X
4,414,950  11/1983 Otsuka et al. ............... 123/585 X
4,453,514  6/1984  Martinsons et al. .......... 123/585 X

FOREIGN PATENT DOCUMENTS

8249  1/1983  Japan ............................. 123/339

Primary Examiner—Tony M. Argenbright
Attorney, Agent, or Firm—Lyon & Lyon

[57] ABSTRACT

An idling speed control method which is adapted to detect by detecting means predetermined rotational angle positions of an internal combustion engine having supplementary air supply control means that regulates the quantity of supplementary air being supplied to the engine, and to control the ratio of operating duty of the supplementary air supply control means to an interval of time at which pulses of a signal indicative of the predetermined rotational angle positions are generated, in a feedback manner responsive to the difference between actual idling engine speed and desired idling speed. When an abnormality is detected in the detecting means, which includes a sensor for sensing the predetermined crank angle positions, a maximum quantity of supplementary air is supplied to the engine by operating the supplementary air quantity control means to its operating limit. The supplementary air supply control means may comprise either (1) a solenoid valve disposed in a supplementary air passage, one end of which communicates with an intake passage of the engine at a location downstream of a throttle valve arranged in the intake passage and the other end communicates with the atmosphere, or (2) a negative pressure-operated means disposed for operating the throttle valve to open or close in response to negative pressure in the intake passage at a zone downstream of the throttle valve, and a negative pressure control means for controlling the magnitude of negative pressure in the intake passage acting upon the negative pressure-operated means.

3 Claims, 4 Drawing Figures

IDLING SPEED FEEDBACK CONTROL METHOD HAVING FAIL-SAFE FUNCTION FOR ABNORMALITIES IN FUNCTIONING OF CRANK ANGLE POSITION-DETECTING SYSTEM OF AN INTERNAL COMBUSTION ENGINE

BACKGROUND OF THE INVENTION

This invention relates to an idling speed control method for internal combustion engines, and more particularly to a method of the type described which is adapted to prevent engine stalling even if the engine is subjected to a maximum load that can be estimated when an abnormality occurs in a detecting system for detecting the rotational angle position of the engine, which includes a sensor for sensing predetermined crank angle positions of the engine.

In an internal combustion engine, the engine can easily stall due to a drop in the engine speed when the engine is operated in an idling condition at a low temperature of the engine cooling water, or when the engine is heavily loaded during idling operation with electrical loads by head lamps, mechanical loads by air conditioner, etc. in a vehicle equipped with the engine. To eliminate such disadvantage, an idling speed feedback control method has been known e.g. by Japanese Provisional Patent Publication (Kokai) No. 55-98628, which comprises setting a desired idling speed value in dependence upon loads on the engine, detecting the difference between actual engine speed and the desired idling speed, and supplying supplementary air to the engine in a quantity corresponding to the detected difference so as to minimize the same difference, to thereby control the engine speed to the desired idling speed.

As a method of controlling supplementary air quantity control means for supplying the engine with the aforementioned supplementary air is known an idling speed feedback control method disclosed in, e.g., Japanese Provisional Patent Publication (Kokai) No. 58-122350. The disclosed method comprises determining the ratio of operating duty of the supplementary air supply control means to an interval of time at which pulses of a signal indicative of predetermined crank angle positions of the engine are generated, e.g., a top-dead-center (TDC) signal, in dependence upon the difference between actual engine speed and desired idling speed, and driving the supplementary air quantity control means in dependence upon the operating duty ratio, whereby the engine is supplied with a required quantity of supplementary air.

With the foregoing control method, if an abnormality develops in the detecting system which includes a TDC sensor for generating the TDC signal, the wiring of the sensor, and an input device that receives the output signal of the sensor, the TDC signal which gives the TDC interval to serve as a reference no longer arrives as an input. This makes it difficult to properly control the duty ratio of the supplementary air supply control means. When such is the case, it may be considered to use a cylinder-discriminating signal in place of the faulty TDC signal, for control of the duty ratio of the supplementary air supply control means, with the time interval at which pulses of the cylinder-discriminating signal are generated serving as a reference. With such an expedient, however, difficulties arise for the following reason. Specifically, assuming that the engine is, e.g., a four-cylinder engine, the cylinder-discriminating signal pulse is generated once per four TDC signal pulses. If the supplementary air supply control means is operated with the cylinder-discriminating signal pulse interval as a reference when the amount of supplementary air needed corresponds to a duty ratio of 25% to the TDC signal pulse interval as the reference, then a quantity of supplementary air corresponding to the duty ratio of 25% will be supplied to the engine at one time upon the lapse of a predetermined period of time after the cylinder-discriminating signal pulse has been generated. Therefore, though the quantity of supplementary air supplied for all four cylinders is the same regardless of whether the TDC signal pulse interval or the cylinder-discriminating signal pulse interval is used as the reference, the situation is such that when the supplementary air supplied to each of the cylinders is injected with the cylinder-discriminating signal pulse as the reference, the quantity of supplementary air supplied to one or two cylinders is equivalent to that for four cylinders, so that the remaining cylinders receive almost no supplementary air at all, resulting in an imbalance in the quantity of supplementary air supplied to the cylinders. This imbalance in the quantity of supplementary air supplied to the engine cylinders has a major influence upon the engine operating condition and, in certain cases, can lead to problems such as hunting, engine stalling, etc.

SUMMARY OF THE INVENTION

It is the object of this invention to provide an idling speed control method which is adapted to make a supplementary air quantity control means operate in a fail-safe mode to compensate for abnormality in a crank angle position-detecting system for detecting the rotational angle position of the engine, that includes a sensor for sensing predetermined crank angle positions of an internal combustion engine when such abnormality occurs, to thereby prevent engine stalling even if the engine is subjected to a maximum load that can be estimated during engine idling.

According to the present invention, an idling speed control method is provided which is adapted to detect by detecting means predetermined rotational angle positions of an internal combustion engine having supplementary air supply control means that regulates the quantity of supplementary air being supplied to the engine, and to control the ratio of operating duty of the supplementary air supply control means to an interval of time at which pulses of a signal indicative of the predetermined rotational angle positions are generated, in a feedback manner responsive to the difference between actual idling engine speed and desired idling speed.

The method according to the invention is characterized by comprising the following steps: (a) detecting whether or not there is an abnormality in the above detecting means, and (b) supplying a maximum quantity of supplementary air to the engine by operating the supplementary air quantity control means to its operating limit when an abnormality is detected in the detecting means.

The engine has an intake passage, a throttle valve arranged in the intake passage, and an air passage, one end of which communicates with the intake passage at a location downstream of the throttle valve and the other end communicates with the atmosphere, and preferably the supplementary air supply control means may comprise either (1) a solenoid valve disposed for regulating the quantity of supplementary air being supplied to the engine through the above air passage, or (2) a negative pressure-operated means disposed for operating the throttle valve to open or close in response to negative pressure in the intake passage at a zone downstream of the throttle valve, and a negative pressure control means for controlling the magnitude of negative pressure in the intake passage acting upon the negative pressure-operated means.

The above and other objects, features, and advantages of the invention will be more apparent from the ensuing detailed description taken in conjunction with the accompanying drawings.

DETAILED DESCRIPTION

The method of the invention will now be described in detail with reference to the drawings.

Figure 1:
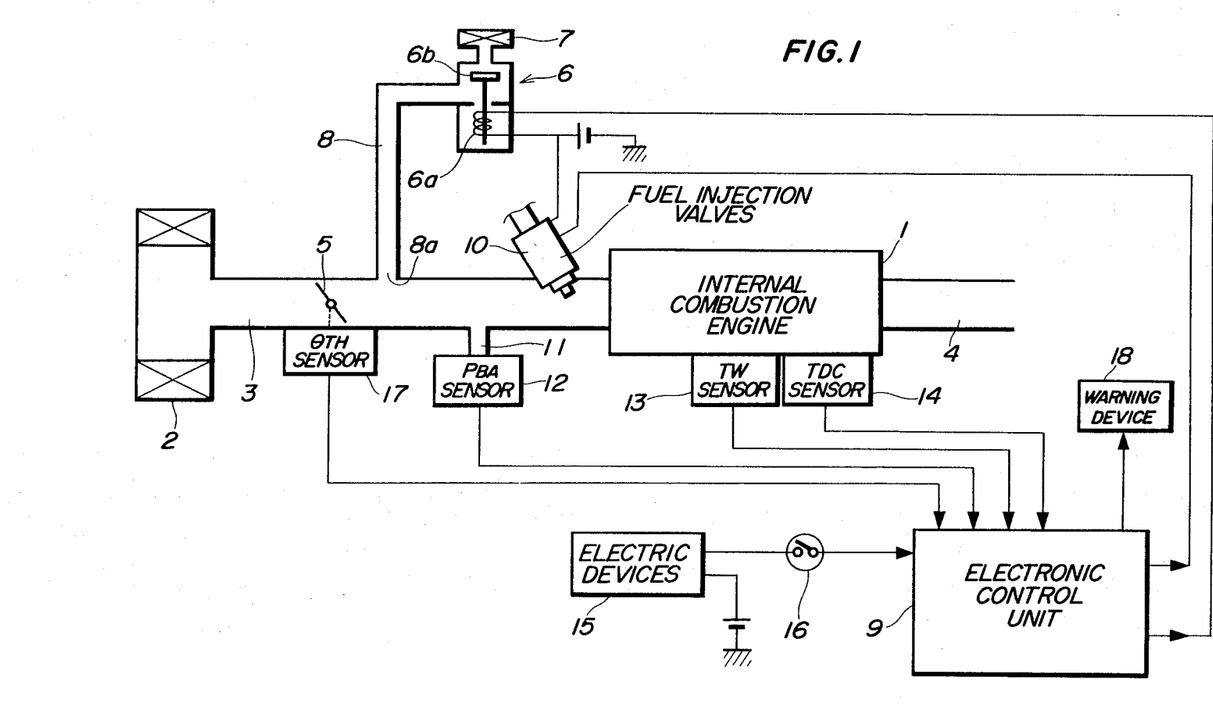
FIG. 1 is a block diagram illustrating, by way of example, the whole arrangement of an idling speed feedback control system to which is appliable the method according to the present invention.

Referring first to FIG. 1, an idling speed feedback control system is schematically illustrated, to which is applicable the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and an exhaust side of the engine 1, respectively. A throttle valve 5 is arranged in the intake pipe 3. An air passage 8 opens at its one end 8a in the intake pipe 3 at a location downstream of the throttle valve 5, its other end communicating with the atmosphere through an air cleaner 7. A supplementary air quantity control valve (hereinafter merely called "the control valve") 6 is arranged across the air passage 8 to control the quantity of supplementary air being supplied to the engine 1 through the air passage 8. This control valve 6 is a normally closed type and comprises a solenoid 6a and a valve 6b disposed to open the air passage 8 when the solenoid 6a is energized. The solenoid 6a is electrically connected to an electronic control unit (hereinafter called "ECU") 9. A fuel injection valve 10 is arranged in a manner projected into the intake pipe 3 at a location between the engine 1 and the open end 8a of the air passage 8, and is connected to a fuel pump, not shown, and also electrically connected to the ECU 9.

A throttle valve opening (θth) sensor 17 is mounted on the throttle valve 5, and an intake air absolute pressure (PBA) sensor 12 is provided in communication with the intake pipe 3 through a conduit 11 at a location downstream of the open end 8a of the air passage 8, while an engine cooling water (TW) temperature sensor 13 and a TDC sensor 14 for sensing predetermined crank angle positions of the engine 1 are both mounted on the body of the engine 1. All the sensors are each electrically connected to the ECU 9. Reference numeral 15 designates electrical devices such as head lamps, a radiator fan, etc., which are electrically connected to the ECU 9 by way of a switch 16, and 18 a warning device also electrically connected to the ECU 9.

The idling speed feedback control system constructed as above operates as follows: In response to a TDC signal supplied from the TDC sensor 14, the ECU 9 determines whether or not the value of the TDC signal is normal, in a manner described in detail below. If the value of the TDC signal is found to be normal, the ECU 9 stores the TDC signal value as one of the parameter signal values indicative of operating conditions of the engine. Other engine operation parameter signals generated by the absolute pressure sensor 12, the engine cooling water temperature sensor 13, and the throttle valve opening sensor 17 are supplied to the ECU 9. Then, the ECU 9 determines operating conditions of the engine 1 and electrical loads on same on the basis of the read values of these engine operation parameters and a signal indicative of electrical loads on the engine supplied to the ECU 9 from the electrical devices 15, and then calculates a desired quantity of fuel to be supplied to the engine 1, that is, a desired valve opening period of the fuel injection valve 10, and also a desired quantity of supplementary air to be supplied to the engine 1, that is, a desired valve opening period TOUT of the control valve 6, on the basis of the determined operating conditions of the engine and electrical loads on the engine. Then, the ECU 9 supplies driving pulses corresponding to the calculated values to the fuel injection valve 10 and the control valve 6 in synchronism with generation of the TDC signal.

Each time a poulse of the TDC signal is generated, the control valve 6 has its solenoid 6a energized by each of its driving pulses for a period of time corresponding to its calculated valve opening period TOUT to open its valve body 6b, thereby opening the air passage 8 so that a quantity of supplementary air corresponding to the calculated valve opening period value TOUT is supplied to the engine 1 through the air passage 8 and the intake pipe 3.

The fuel injection valve 10 is energized by each of its driving pulses to open for a period of time corresponding to its calculated valve opening period value to inject fuel into the intake pipe 3. The ECU 9 operates so as to supply an air/fuel mixture having a desired air/fuel ratio, e.g. a theoretical air/fuel ratio, to the engine 1.

When the valve opening period TOUT of the control valve 6 is increased to increase the quantity of supplementary air, an increased quantity of the mixture is supplied to the engine 1 to increase the engine output, resulting in an increase in the engine speed, whereas a decrease in the above valve opening period TOUT causes a corresponding decrease in the quantity of the mixture supplied to the engine 1, resulting in a decrease in the engine speed. In this manner, the engine speed is controlled by controlling the quantity of supplementary air or the valve opening period TOUT of the control valve 6.

On the other hand, if the ECU 9 determines that the value of the TDC signal is abnormal, the ECU 9, for example, warns the driver by actuating a warning device 18, which gives an indication of the abnormality in the detecting system that includes the TDC sensor 14. At the same time, the ECU 9 opens the control valve 6 to its maximum opening so that the ratio of the driving signal pulse for the control valve 6 to the TDC signal pulse interval (hereinafter referred to as "the duty factor") DOUT will attain a value of 100%, whereby the engine is supplied with the maximum amount of supplementary air. The foregoing will be described below in greater detail.

The period of time TOUT during which the control valve 6 is open, and the valve opening duty factor DOUT mentioned above, are related by the following equation:

$$TOUT = DOUT/100 \times Men \qquad (1)$$

Figure 2:
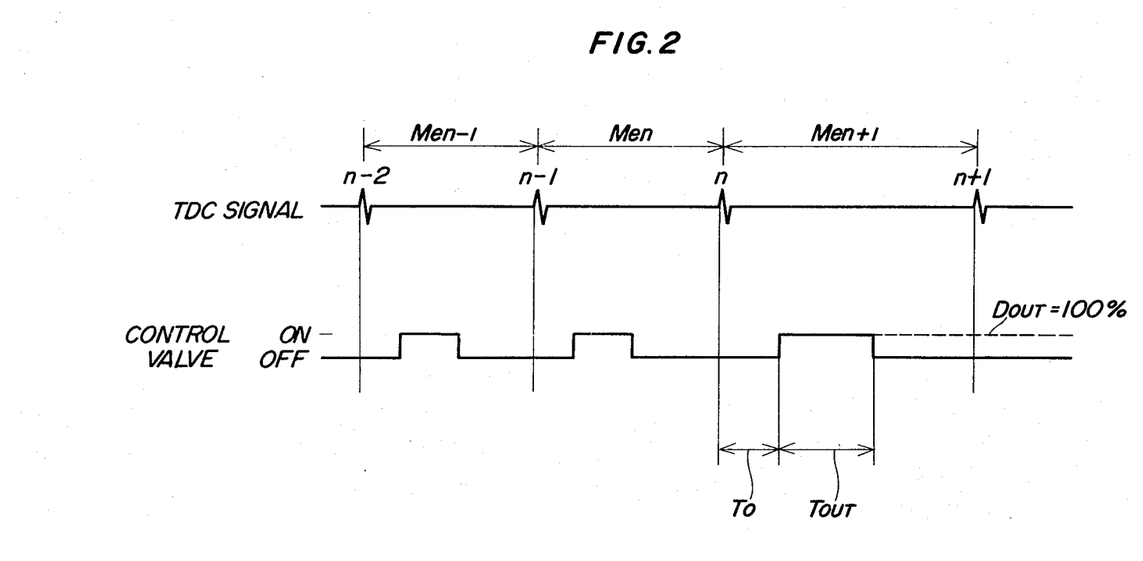
FIG. 2 is a timing chart showing the relationship between a time interval Me, at which pulses of a signal indicative of predetermined crank angle positions (TDC) are generated, and the operating period of the supplementary air supply, control means.

FIG. 2 is a view showing the relationship between a time interval Me, at which the TDC signal pulses are generated, and the valve opening period TOUT of the control valve 6. In Equation (1) above, Men represents a time interval extending from generation of an $(n-1)$th TDC signal pulse to generation of the $n-$th TDC signal pulse, and the value of Me is proportional to the reciprocal of engine speed Ne. In other words, the time interval Me decreases as the engine speed Ne increases. As expressed by Equation (1), the valve opening period TOUT is determined by multiplying the value of the time interval Me by the valve opening duty factor DOUT (in percentage), with Me serving as a basic value. Although the calculation of the valve opening period TOUT after inputting of the present $n-$th pulse of the TDC signal should be made by using the corresponding time interval Men+1 to obtain exact calculated values, the value of Men+1 is not yet known at the time the period TOUT is calculated, and the value Men+1 is nearly equal to the previously applied value of Men. Therefore, the value of Men is used for calculating the value of TOUT.

In Equation (1), the valve opening duty factor DOUT has its value determined upon inputting of each pulse of the TDC signal as a function of such operating parameters as engine speed, engine cooling water temperature, electrical loads, etc., as set forth above, and is set to appropriate values so as to regulate the desired idling speed to a value best suited for the engine load during idling.

According to the present invention, the valve opening duty factor DOUT is set to 100% when an abnormality occurs in the rotational angle position-detecting system of the engine including the TDC sensor 14. This means that the control valve 6, controlled at a valve opening duty factor DOUT of 100%, will be held in the fully open position substantially continuously, as will be obvious from Equation (1). In such case, the control valve continues to be held open even after generation of the $(n+1)$th TDC signal pulse, as illustrated by the broken line in FIG. 2.

In FIG. 2, symbol To represents a constant signifying a valve opening time lag and is set on the basis of the time required for the data signals to be read in, the time required for calculation of the valve opening period TOUT, the air intake delay time, etc., which is experimentally determined depending upon the configuraion of the intake passage, etc. Following generation of the TDC signal pulse, the control valve 6 is opened upon passage of this valve opening time lag To.

Figure 3:
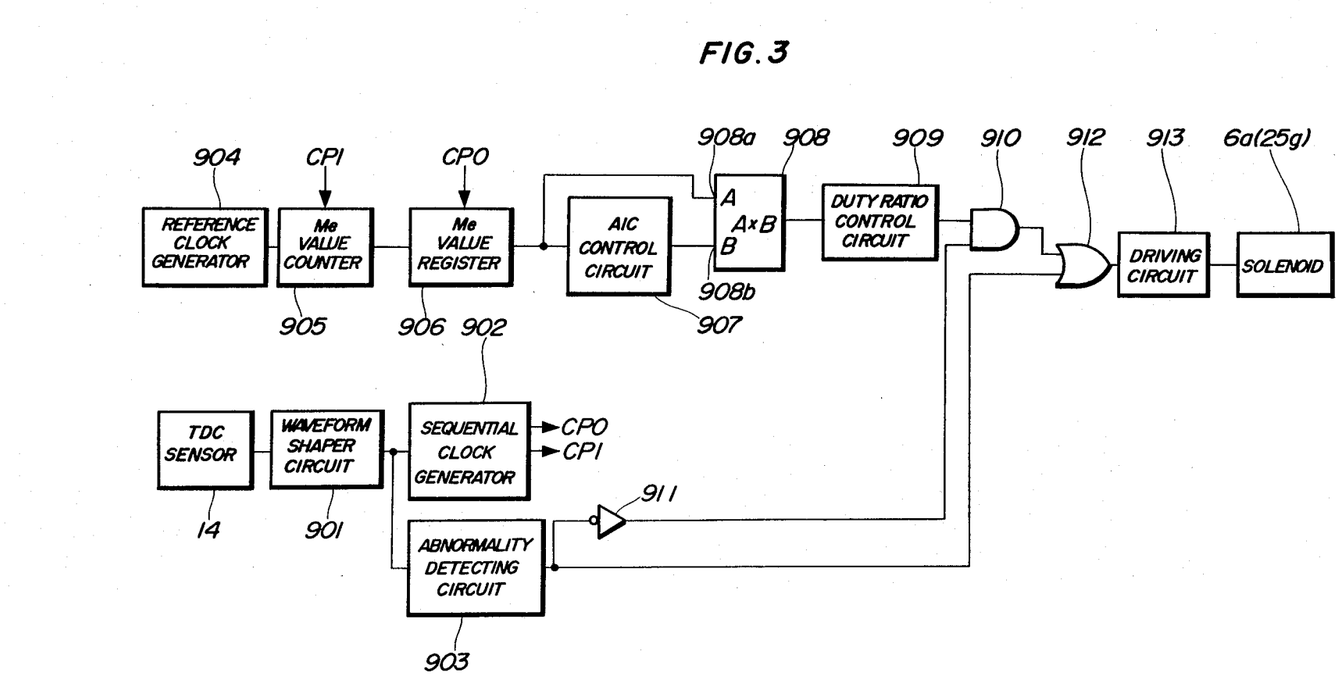
FIG. 3 is a circuit diagram illustrating an electrical circuit within the ECU in FIG. 1.

An example of the electrical control circuit within the ECU 9 will now be described by referring to FIG. 3. The function of the control circuit is to determine whether or not the output of the TDC sensor 14 has developed an abnormal value, and to fully open the control valve 6 when an abnormality occurs.

Following waveform shaping effected by a waveform shaper circuit 901, the TDC signal from the TDC sensor 14 of FIG. 1 is applied to a sequential clock generator 902 and to an abnormality-detecting circuit 903. The sequential clock generator 902 responds to inputting of each pulse of the TDC signal to sequentially generate clock pulses CP0, CP1. The clock pulse CP0 is applied to an Me value register 906 to cause same to be loaded with the immediately preceding value counted by an Me value counter 905 and applied thereto, which counts reference clock pulses provided by a reference clock generator 904 to measure the inrterval of time between two adjacent TDC siganl pulses. Subsequently, the clock signal CP1 is applied to the Me value counter 905 to reset the state thereof, namely this immediately preceding value, to zero. Accordingly, with each generation of a TDC signal pulse, the Me value register 906 stores a counted value Me corresponding to the time interval between the instant at which the immediately preceding TDC signal pulse was generated, and the instant at which the present TDC signal pulse is generated.

The abnormality detecting circuit 903 determines whether or not the TDC signal from the TDC sensor 14 is abnormal. Various manners of making this determination can be considered. For example, a decision to the effect that an abnormality has occurred can be rendered when either of the following conditions holds:

(1) the present TDC signal time interval, namely the ratio of the value of Me to the immediately preceding value of Me, falls outside a predetermined range continuously over a predetermined number of TDC signal pulses, or (2) there is no input of the TDC signal despite the fact that a signal, which is indicative of the fact that a starter (not shown) of the engine has been turned on, arrives as an input continuously over a predetermined period of time.

When the abnormality detecting circuit 903 has determined that the TDC signal is abnormal, the output of the detecting circuit changes in level from "0" to "1", and remains at the high or "1" level from that point onward. Even if the ignition switch of the engine is turned off, the result of this abnormality determination will remain stored in the circuit until, say, the state of the abnormality detecting circuit is reset after repairing the TDC sensor 14 per se, etc. of the rotational angle position-detecting system at an auto repair shop or the like.

The value Me in the Me register 906, namely a value corresponding to the reciprocal of the engine rpm, is applied to a supplementary air supply control circuit (hereinafter referred to as "the AIC control circuit") 907. The AIC control circuit 907 sets a desired idling speed in accordance with signals from the electric devices 15 of FIG. 1 indicative of the electrical loads, a signal from the air conditioner (not shown) or the like indicative of the mechanical load, a signal from the engine cooling water sensor 13 indicative of engine temperature, etc. The AIC control circuit 907 is further adapted to calculate the difference between the desired idling speed and the actual idling speed, which is obtained from the value Me, and to calculate the valve opening duty factor DOUT of the control valve 6 in such a manner as to make this difference approach a value of zero. The value calculated is applied, as a value B, to one input terminal 908b of a multiplier circuit 908. Applied to the other input terminal 908a of the multiplier circuit 908 as a value A is the value Me delivered by the Me value register 906. The multiplier circuit 908 proceeds to take the product of values A and B to calculate the valve opening period TOUT of the control valve 6 in accordance with Equation (1). Also, upon passage of the predetermined time period To indicated in FIG. 2, the multiplier circuit 908 supplies a duty ratio control circuit 909 with the calculated value, which corresponds to the valve opening period TOUT. The duty ratio control circuit 909 produces at its output terminal a high output of "1" at the same time that the calculated value arrives as an input from the multiplier circuit 908. The output of the control circuit 909 remains high for the duration of the valve opening period TOUT, and then reverts to a low level "0".

If the detecting system including the TDC sensor 14 is operating normally, the output of the abnormality detecting circuit 903 is held at the low level of "0", as set forth above. This low-level signal is reversed in level by an inverter 911 into a high-level signal which is applied to an AND circuit 910, whereby the latter is enabled. The aforementioned high-level signal produced for the duration of the valve opening period TOUT by the duty ratio control circuit 909 is applied to a driving circiut 913 through the enabled AND circuit 910 and an OR circuit 912. The driving circuit 913, as long as the high-level signal is applied thereto, supplies the control valve solenoid 6a of FIG. 1 with a driving signal to energize the solenoid.

If the result of the diagnosis performed by the abnormality detecting circuit 903 is that the detecting system including the TDC sensor is abnormal, the output of the detecting circuit 903 changes from the low level "0" to the high level "1", and the resulting high-level signal is inverted by the inverter 911 into a low-level signal, thereby disabling the AND circuit 911. At the same time, the high-level output of the abnormality detecting circuit 903 is applied to the driving circuit 913 through the OR circuit 912. As mentioned above, once the detecting circuit 903 detects that the detecting system having the TDC sensor is abnormal, the output of the detecting circuit 903 is held at the high level of "1" from then onward. Therefore, owing to this high-level signal, the driving circuit 913 continuously produces the drive signal which energizes the solenoid 6a.

Figure 4:
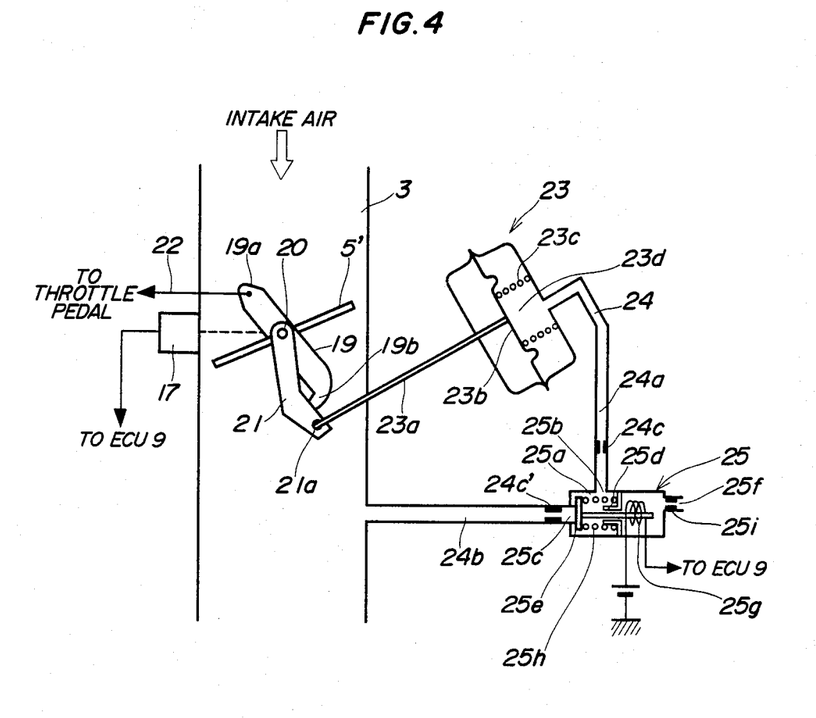
FIG. 4 is a view showing another example of the supplementary air quantity control means applicable to the method of the invention, that is adapted to control the throttle valve opening to regulate the quantity of supplementary air being supplied to the engine.

FIG. 4 illustrates another example of the supplementary air quantity control means, which may be used in lieu of the control valve 6, shown in FIG. 1, and which is a negative pressure-operated type adapted to control the supply of supplementary air to the engine by pneumatically controlling the throttle valve opening value.

A throttle valve 5', shown in FIG. 4, is arranged in the intake passage 3 in place of the throttle valve 5 in FIG. 1, and is provided with a lever 19 for rotating the valve 5' together therewith about a fulcrum 20 on the valve 5'. A second lever 21 is mounted at one end on the same fulcrum 20 for pivotal movement thereabout. To the other end 21a of the lever 21 is attached one end of a rod 23a of a negative presure-operated actuator 23. The lever 19 arranged on the fulcrum 20 has its arms extending in opposite directions from the fulcrum 20. A throttle pedal (not shown) is connected to one end 19a of the lever 19 by means of a wire 22. The lever 19 is disposed such that when the throttle valve 5' is in the vicinity of its fully closed positiion, the other end 19b of the lever 19 abuts against the lever 21 at a location near its end 21a so as to limit its rotational movement, i.e. the rotation of the throttle valve toward its fully closed position, in a manner hereinafter described in detail.

The negative pressure-operated actuator 23 is comprised of the rod 23a disposed to push and pull the lever 21, a diaphragm 23b coupled to the rod 23a for displacement in response to atmospheric pressure or negative pressure from the intake passage selectively applied thereto in a manner hereinafter described in detail, by a three way solenoid valve 25, and a spring 23c disposed to urge the diaphragm 23b so as to make it push down the lever 21 by means of the rod 23a. A vacuum chamber 23d is defined by the diagphragm 23b inside the negative pressure-operated actuator 23. A conduit 24 communicating with the intake passage 3 at a location downstream of the throttle valve 5' arranged therein is connected to the vacuum chamber 23d, and the three way valve 25 is arranged across the conduit 24. The three way valve 25 has a valve chamber 25a which is provided with an opening 25b communicating with the vacuum chamber 23d of the negative pressure-operated actuator 23 through a downstream portion 24a of the conduit 24, a second opening 25c communicating with the intake passage 3 through an upstream portion 24b of the conduit 24 and a third opening 25d communciating with the atmosphere through a communication passage 25f. The three way valve 25 further includes a valve body 25e arranged in the valve opening 25a and urged by a spring 25h for closing the opening 25c to interrupt the communication between the vacuum chamber 23d of the negative pressure-operated actuator 23 and the intake passage 3 and simultaneously establish the communication between the vacuum chamber 23d and the atmosphere by way of the opening 25d then open, and a solenoid 25g which, when energized, forces the valve body 25e into contact with the opening 25d against the force of the spring 25h to reestablish the communication between the vacuum chamber 23d of the negative pressure-operated actuator 23 and the intake passage 3. The solenoid 25g is electrically connected to the ECU 9 in FIG. 1.

A throttle valve opening sensor 17 is, on one hand, mechanically connected to the throttle valve 5', and, on the other hand, is electrically connected to the ECU 9.

The operation of the supplementary air quantity control means of FIG. 4 constructed as above will now be explained.

When the throttle pedal (not shown) is not stepped on (that is, the stepping amount is zero), the throttle valve 5' is kept in a closed position (clockwise extreme position as viewed in FIG. 4) by the force of a spring, not shown, with the end 19b of the lever 19 in contact with the lever 21. Now, if the feedback control of the engine speed at engine idling is effected and it is required to supply supplimentary air to the engine 1, the ECU 9 calculates the duty factor of the valve opening period of the three way valve 25 in response to the required quantity of supplementary air to be supplied to the engine, in the same manner as previously explained. The valve body 25e of the three way valve 25 has its solenoid 25g energized with a pulse duty factor corresponding to the above calculated duty factor and in synchronism with generation of each pulse of the TDC signal. As long as the solenoid 25g is energized, the opening 25c is opened to introduce the negative pressure from a location downstream of the throttle valve 5' in the intake passage 3 into the vacuum chamber 23d of the negative pressure-operated actuator 23, thereby determining the amount of negative pressure in the vacuum chamber 23d. In other words, the value of negative pressure prevailing in the vacuum chamber 23d is determined by the time ratio between communication of the vacuum chamber 23d with the intake passage 3 and communciation of the same chamber 23d with the atmosphere, which ratio corresponds to the above duty factor with which the valve body 25e is repeatedly opened and closed in synchronism with generation of each TDC signal pulse. In this way, the larger the duty factor, the larger the negative pressure in the vacuum chamer 23d becomes. The upstream portion 24a and downstream portion 24b of the conduit 24 and the passage 25f through which the three way valve 25 communicates with the atmosphere are all provided with orifices 24c, 24c' and 25i respectively arranged therein, thereby enabling not only to obtain a best suitable response of the diaphragm 23b but also to prevent abrupt fluctuations in the pressure of the vacuum chamber 23d.

When the negative pressure in the vacuum chamber 23d increases, the diaphragm 23b is displaced in response to the difference between the pressures applied on its opposite sides, against the force of the spring 23c in a direction decreasing the volume of the vacuum chamber 23d (the rightward and upward direction as viewed in FIG. 4), thereby causing the lever 21 to rotate in the counterclockwise direction by means of the rod 23a connected to the diaphragm 23b. This causes both the lever 19 and the throttle valve 5' formed integrally at one end of the lever 19 to rotate about the fulcrum 20 so as to open the throttle valve 5' to supply the required quantity of supplementary air to the engine 1.

When the supply of supplementary air to the engine becomes unnecessary, the ECU 9 sets the duty factor for the three way valve 25 to zero to deenergize the solenoid 25g. Therefore, the valve body 25e of the three way valve 25 closes the opening 25c and opens the 25d, thereby causing the vacuum chamber 23d of the negative pressure-operated actuator 23 to communicate with the atmosphere, so as to make the difference between the pressures applied on opposite sides of the diaphragm 23b become zero so that the diaphragm is displaced by the force of the spring 23c in a direction increasing the volume of the vacuum pressure chamber 23d (the leftward and downward as viewed in FIG. 4), pushing down the lever 21 by means of the rod 23a, thereby causing the throttle valve 5' to be returned to a fully closed position by the force of the spring, not shown.

On this occasion, when the throttle pedal is stepped on, the lever 19 is rotated by way of the wire 22, in the counterclockwise direction, causing the throttle valve 5' also to open to an opening corresponding to the stepping-on amount of the throttle pedal. Further on this occasion, when the throttle pedal is stepped on and accordingly the lever 19 rotates, the lever 21 remains at its previous position as it is unaffected by the rotation of the lever 19.

The operation described above applies when a normal value of the TDC signal is supplied to the ECU 9, without any abnormality occurring in the rotational angle position-detecting system including the TDC sensor 14. When any abnormality occurs in the detecting system, the ECU 9 sets the duty factor of the three way valve 25 to 100 percent as previously explained with reference to FIGS. 2 and 3. More specifically, when and after any abnormality occurs in the detecting system, the solenoid 25g of the three way valve 25 is maintained in an energized state, causing the valve body 25e to close the opening 25d and open the opening 25c, thereby maximizing the negative pressure in the vacuum chamber 23d of the negative pressure-operated actuator 23, that is, to make it equal to the negative pressure in the intake passage 3 downstream of the throttle valve 5', thereby maximizing the displacement of the diaphragm 23b, causing the lever 21 to rotate in the counterclockwise direction by means of the rod 23a, in turn causing the throttle valve 5' to open to a predetermined maximum opening value, to supply the maximum quantity of supplementary air required for the engine at engine idling with the maximum engine load applied on the same.

In the case of the above throttle valve opening control for the purpose of regulating the supply of supplementary air to the engine, such control may be effected by any other suitable supplementary air quantity control means than the one illustrated, for example, the rod 23a may be directly operated by the solenoid in place of the negative pressure-operated actuator 23.

What is claimed is:

1. An idling speed control method which is adapted to detect by detecting means predetermined rotational angle positions of an internal combustion engine having supplementary air supply control means which regulates the quantity of supplementary air being supplied to said engine, and to control the ratio of operating duty of said supplementary air supply control means to an interval of time at which pulses of a signal indicative of the predetermined rotational angle positions are generated, in a feedback manner responsive to the difference between actual idling engine speed and desired idling speed, the method comprising the steps of: (a) detecting whether or not there is an abnormality in said detecting means, and (b) supplying a maximum quantity of supplementary air to said engine by operating said supplementary air quantity control means to an operating limit thereof, when an abnormality is detected in said detecting means.

2. An idling speed control method as claimed in claim 1, wherein said engine has an intake passage, and a throttle valve arranged in said intake passage, and an air passage, one end of which communicates with said intake passage at a location downstream of said throttle valve and the other end communicates with the atmosphere, said supplementary air supply control means comprising a solenoid valve disposed for regulating the quantity of supplementary air being supplied to said engine through said air passage, and wherein step (b) is performed by operating said solenoid valve.

3. An idling speed control method as claimed in claim 1, wherein said engine has an intake passage and a throttle valve arranged within said intake passage, said supplementary air supply control means comprising a negative pressure-operated means disposed for operating said throttle valve to open or close in response to negative pressure in said intake passage at a zone downstream of said throttle valve, and a negative pressure control means for controlling the magnitude of negative pressure in said intake passage acting upon said negative pressure-operated means, and wherein step (b) is performed by operating said solenoid valve.

* * * * *

UNITED STATES PATENT AND TRADEMARK OFFICE
CERTIFICATE OF CORRECTION

PATENT NO. : 4,531,490

DATED : July 30, 1985

INVENTOR(S) : NORIYUKI KISHI; TAKASHI KOUMURA; and TAKEHIKO HOSOKAWA

It is certified that error appears in the above-identified patent and that said Letters Patent is hereby corrected as shown below:

At column [73] Assignee: Honda Giken Kogyo Kabushiki Kaisha, Tokyo, Japan add: --Matsushita Electric Industrial Co., Ltd. Osaka, Japan--

Signed and Sealed this

Tenth Day of June 1986

[SEAL]

Attest:

DONALD J. QUIGG

Attesting Officer

Commissioner of Patents and Trademarks